United States Patent
Hearn et al.

(10) Patent No.: US 9,992,212 B2
(45) Date of Patent: Jun. 5, 2018

(54) TECHNOLOGIES FOR HANDLING MALICIOUS ACTIVITY OF A VIRTUAL NETWORK DRIVER

(71) Applicant: Intel Corporation, Santa Clara, CA (US)

(72) Inventors: James R. Hearn, Hillsboro, OR (US); Matthew Vick, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 14/934,142

(22) Filed: Nov. 5, 2015

(65) Prior Publication Data

US 2017/0134403 A1 May 11, 2017

(51) Int. Cl.
*H04L 29/06* (2006.01)

(52) U.S. Cl.
CPC .......... *H04L 63/1416* (2013.01); *H04L 63/14* (2013.01); *H04L 63/145* (2013.01); *H04L 63/1425* (2013.01)

(58) Field of Classification Search
CPC . H04L 63/14; H04L 63/1408; H04L 63/1416; H04L 63/1425; H04L 63/1441; H04L 63/145; H04L 63/1455
See application file for complete search history.

(56) References Cited

U.S. PATENT DOCUMENTS

| | | | |
|---|---|---|---|
| 2012/0254862 A1 | 10/2012 | Dong | |
| 2014/0298339 A1 | 10/2014 | Jani | |
| 2014/0317737 A1* | 10/2014 | Shin | H04L 63/1408 726/23 |
| 2014/0359611 A1 | 12/2014 | Kutch | |
| 2015/0040217 A1* | 2/2015 | Abuelsaad | H04L 63/1408 726/22 |
| 2015/0052614 A1 | 2/2015 | Crowell et al. | |
| 2015/0212843 A1 | 7/2015 | Turgeman et al. | |

OTHER PUBLICATIONS

International Search Report for PCT/US16/054497, dated Jan. 11, 2017 (3 pages).
Written Opinion for PCT/US16/054497, dated Jan. 11, 2017 (7 pages).

* cited by examiner

*Primary Examiner* — Edward Zee
(74) *Attorney, Agent, or Firm* — Barnes & Thornburg LLP

(57) ABSTRACT

Technologies for handling malicious activity of a virtual network driver include a network computing device on which a virtual machine is being executed and the virtual network driver is managing communication between the physical network interface controller and the virtual function network adapter. The network computing device is configured to monitor events handled by the virtual network driver to detect malicious activity and update one or more malicious event tracking variables corresponding to a type of malicious activity event detected. The network computing device is further configured to compare one or more of the malicious event tracking variables to a corresponding malicious event threshold and perform an action on the virtual function driver in response to a determination that one or more of the malicious event tracking variables indicates that the corresponding malicious event threshold has been violated. Other embodiments are described and claimed herein.

25 Claims, 4 Drawing Sheets

TECHNOLOGIES FOR HANDLING MALICIOUS ACTIVITY OF A VIRTUAL NETWORK DRIVER

BACKGROUND

Network operators and communication service providers typically rely on complex, large-scale data centers comprised of a multitude of network computing devices (e.g., servers, switches, routers, etc.) to process network traffic through the data center. In order to provide scalability to meet network traffic processing demands and reduce operational costs, certain data center operations are typically run inside containers or virtual machines (VMs) in a virtualized environment of the network computing devices. To coordinate the functionality enabling physical hardware of a network computing device on which a VM is running with the virtual environment of the VM, the VM typically requires exposing a virtualized instance of a virtual function. For example, a virtual function, such as a PCI Express (PCIe) virtual function, can provide a mechanism for the direct transfer of data between the VM and a network interface controller (NIC) of the network computing device. To do so, the network computing device generally relies on a virtual function driver to manage the virtual function (e.g., read/write to the virtual function's configuration space).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
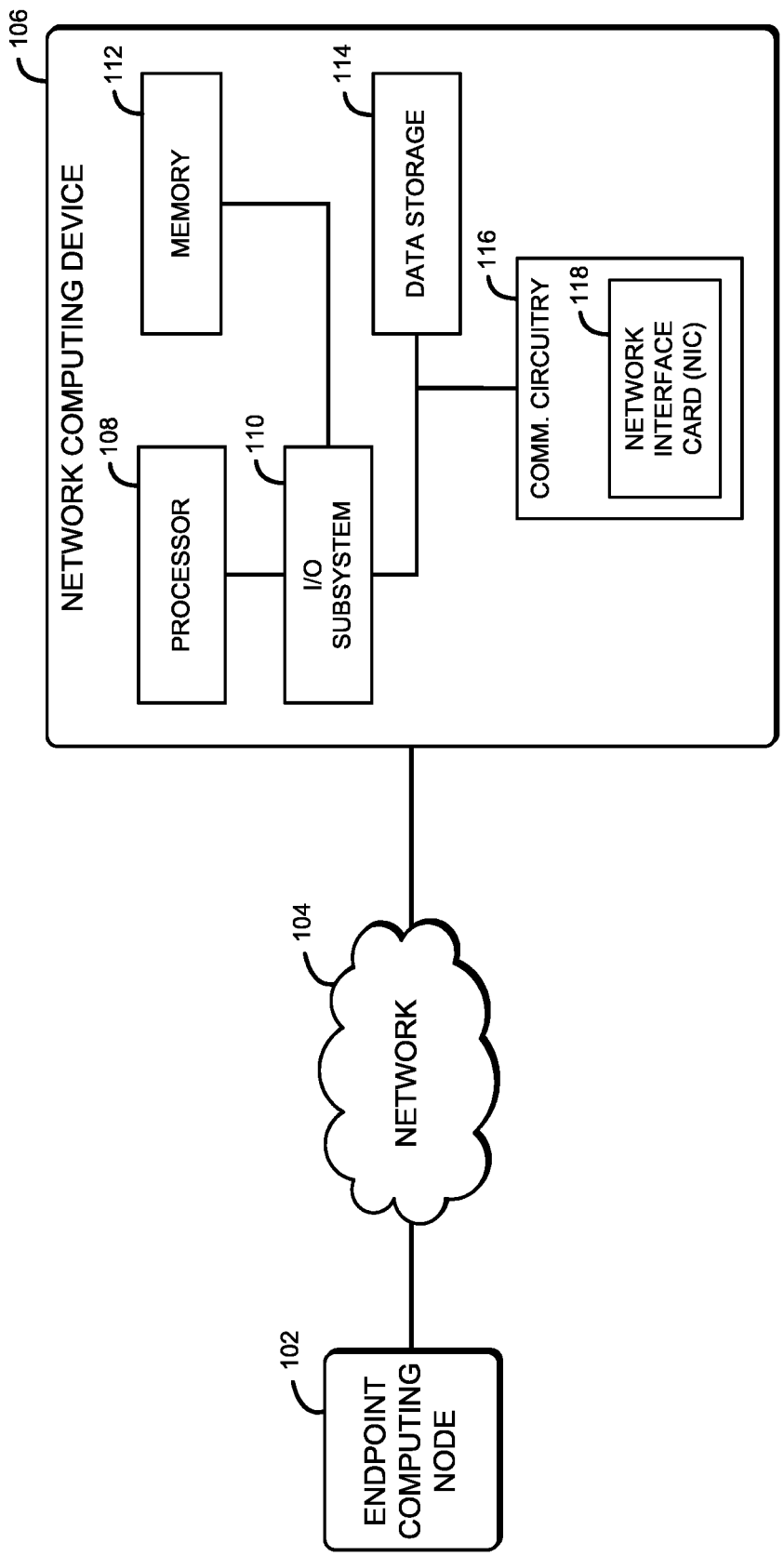
FIG. 1 is a simplified block diagram of at least one embodiment of a system for handling malicious activity of a virtual function driver at a network computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for handling of malicious activity detected at a virtual function driver includes an endpoint computing node 102 communicatively coupled to a network computing device 106 via a network 104. In use, the network computing device 106 performs various operations (e.g., services) on network traffic (i.e., network packets, messages, etc.) received at the network computing device 106. It should be appreciated that the received network traffic may be forwarded to additional other network computing devices 106 and to another endpoint node communicatively coupled to the network computing device 106 (e.g., via the network 104).

To process the network traffic, the network computing device 106 is configured to spin up multiple virtual machines (VMs) at the network computing device 106. Accordingly, the network computing device 106 is configured to map physical components of the network computing device 106 to virtual functions of the various VMs. For example, a virtual function driver may be executed by the network computing device 106 to manage communications between a physical network interface controller (NIC) (see, e.g., the NIC 118 of FIG. 1) and a virtual function network adapter (i.e., a virtualized instance of the physical NIC). It should be appreciated, however, that in some embodiments, one or more of the VMs may be spawned on one or more other network computing devices communicatively coupled to the network computing device 106.

During processing of the network traffic, the virtual function drivers are susceptible to manipulation by disruptive network packets, such as malformed network packets, which typically result in a reset of the virtual device to clear state of the virtual device upon detection of the malicious event. However, resetting the virtual device may allow a malicious driver to restart its attack. Further, multiple resets of the virtual device can impact performance (e.g., hang the virtual port) or result in a reset loop effectively locking the network computing device 106. Accordingly, the network computing device 106 is configured to track each reset of the virtual device due to a detected malicious activity, such as by a counter corresponding to a particular type of malicious activity, and compare the tracked results to one or more thresholds. Based on the comparison, the network computing device is configured to reset the virtual device (i.e., the comparison determined the threshold(s) are not violated) or remove the VM (i.e., remove the virtual function interface from the VM) associated with the malicious activity from the network (i.e., the comparison determined the threshold(s) are violated) and notify an administrator of the network (i.e., the administrator of the network on which the network computing device 106 is being coupled).

The endpoint computing node 102 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system.

The network 104 may be embodied as any type of wired or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other network computing devices (e.g., virtual and physical routers, switches, network hubs, servers, storage devices, compute devices, etc.), as needed to facilitate communication between the endpoint computing node 102 and the network computing device 106.

The network computing device 106 may be embodied as any type of network traffic processing device that is capable performing the functions described herein, such as, without limitation, a server (e.g., stand-alone, rack-mounted, blade, etc.), a network appliance (e.g., physical or virtual), a switch (e.g., rack-mounted, standalone, fully managed, partially managed, full-duplex, and/or half-duplex communication mode enabled, etc.), a router, a web appliance, a distributed computing system, a processor-based system, and/or a multiprocessor system. The illustrative network computing device 106 includes a processor 108, an input/output (I/O) subsystem 110, a memory 112, a data storage device 114, and communication circuitry 116. Of course, the network computing device 106 may include other or additional components, such as those commonly found in a computing device, in other embodiments. Additionally, in some embodiments, one or more of the illustrative components may be incorporated in, or otherwise form a portion of, another component. For example, the memory 112, or portions thereof, may be incorporated in the processor 108 in some embodiments. Further, in some embodiments, one or more of the illustrative components may be omitted from the network computing device 106.

The processor 108 may be embodied as any type of processor capable of performing the functions described herein. For example, the processor 108 may be embodied as a single or multi-core processor(s), digital signal processor, microcontroller, or other processor or processing/controlling circuit. Similarly, the memory 112 may be embodied as any type of volatile or non-volatile memory or data storage capable of performing the functions described herein. In operation, the memory 112 may store various data and software used during operation of the network computing device 106, such as operating systems, applications, programs, libraries, and drivers. The memory 112 is communicatively coupled to the processor 108 via the I/O subsystem 110, which may be embodied as circuitry and/or components to facilitate input/output operations with the processor 108, the memory 112, and other components of the network computing device 106. For example, the I/O subsystem 110 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 110 may form a portion of a system-on-a-chip (SoC) and be incorporated, along with the processor 108, the memory 112, and other components of the network computing device 106, on a single integrated circuit chip.

The data storage device 114 may be embodied as any type of device or devices configured for short-term or long-term storage of data such as, for example, memory devices and circuits, memory cards, hard disk drives, solid-state drives, or other data storage devices. It should be appreciated that the data storage device 114 and/or the memory 112 (e.g., the computer-readable storage media) may store various data as described herein, including operating systems, applications, programs, libraries, drivers, instructions, etc., capable of being executed by a processor (e.g., the processor 108) of the network computing device 106.

The communication circuitry 116 may be embodied as any communication circuit, device, or collection thereof, capable of enabling communications between the network computing device 106 and other computing devices (e.g., the endpoint computing node 102, another network computing device, etc.) over a network (e.g., the network 104). The communication circuitry 116 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 116 includes a network interface controller (NIC) 118. The NIC 118 may be embodied as one or more add-in-boards, daughtercards, network interface cards, controller chips, chipsets, or other devices that may be used by the network computing device 106. For example, in some embodiments, the NIC 118 may be integrated with the processor 108, embodied as an expansion card coupled to the I/O subsystem 110 over an expansion bus (e.g., PCI Express), part of an SoC that includes one or more processors, or included on a multichip package that also contains one or more processors.

Alternatively, in some embodiments, the NIC 118 may include a local processor (not shown) and/or a local memory (not shown) that are both local to the NIC 118. In such embodiments, the local processor of the NIC 118 may be capable of performing the offloaded functions (e.g., replication, network packet processing, etc.) as described herein. Additionally or alternatively, in such embodiments, the local memory of the NIC 118 may be capable of storing data local to the NIC 118. Additionally or alternatively, in some embodiments, functionality of the NIC 118 may be integrated into one or more components of the network computing device 106 at the board level, socket level, chip level, and/or other levels.

Figure 2:
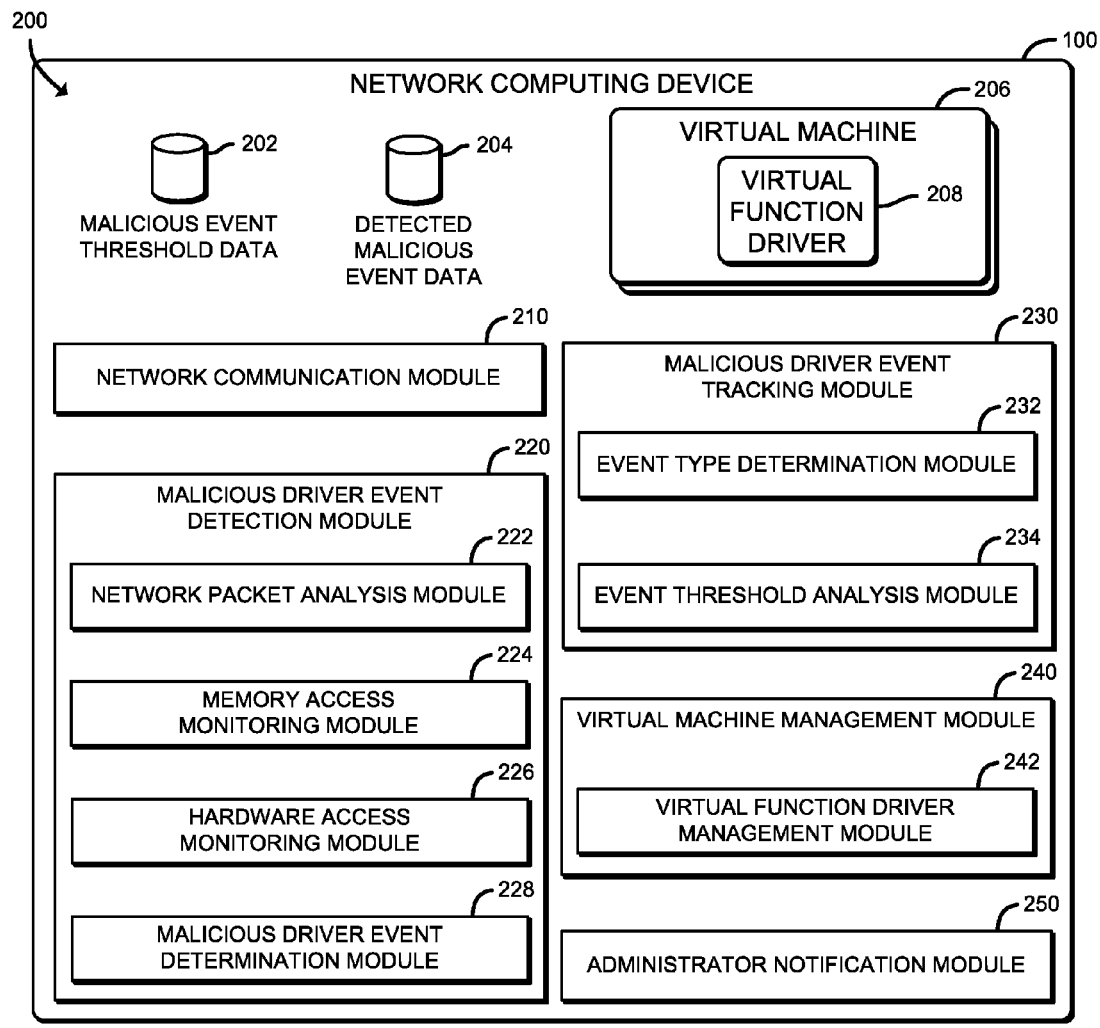
FIG. 2 is a simplified block diagram of at least one embodiment of an environment that may be established by the network computing device of the system of FIG. 1.

Referring now to FIG. 2, in an illustrative embodiment, the network computing device 106 establishes an environment 200 during operation. The illustrative environment 200 includes a network communication module 210, a malicious driver event detection module 220, a malicious driver event tracking module 230, a virtual machine management module 240, and an administrator notification module 250. Each of the modules, logic, and other components of the environment 200 may be embodied as hardware, software, firmware, or a combination thereof. For example, each of the modules, logic, and other components of the environment 200 may form a portion of, or otherwise be established by, the processor 108, the communication circuitry 116 (e.g., the NIC 118), and/or other hardware components of the network computing device 106. As such, in some embodiments, one or more of the modules of the environment 200 may be embodied as circuitry or a collection of electrical devices (e.g., network communication circuitry 210, malicious driver event detection circuitry 220, malicious driver event tracking circuitry 230, virtual machine management circuitry 240, administrator notification circuitry 250, etc.).

In the illustrative environment 200, the network computing device 106 includes malicious event threshold data 202 and detected malicious event data 204, each of which may be accessed by the various modules and/or sub-modules of the network computing device 106. The illustrative environment further includes one or more VMs 206 executed on the network computing device 106. Each of the VMs 206 includes a corresponding virtual function driver 208 for performing the functions described herein. It should be appreciated that the network computing device 106 may include other components, sub-components, modules, sub-modules, and/or devices commonly found in a computing device, which are not illustrated in FIG. 2 for clarity of the description.

The network communication module 210 is configured to facilitate inbound and outbound network communications (e.g., network traffic, network packets, network flows, etc.) to and from the network computing device 106. To do so, the network communication module 210 is configured to receive and process network packets from other computing devices (e.g., the endpoint computing device node 102, another computing device communicatively coupled via the network 104, etc.). Additionally, the network communication module 210 is configured to prepare and transmit network packets to another computing device (e.g., the endpoint computing device node 102, another computing device communicatively coupled via the network 104, etc.). Accordingly, in some embodiments, at least a portion of the functionality of the network communication module 210 may be performed by the communication circuitry 116, and more specifically by the NIC 118.

The malicious driver event detection module 220 is configured to detect one or more malicious driver events. For example, the malicious driver event detection module 220 may be configured to detect (i.e., identify) malformed network packets, invalid memory access requests, restricted memory region access requests, restricted hardware access requests, etc., and update one or more malicious event tracking variables (e.g., counters, timestamps, metrics, etc.) corresponding to the malicious activity detected. To do so, the illustrative malicious driver event detection module 220 includes a network packet analysis module 222, a memory access monitoring module 224, a hardware access monitoring module 226, and a malicious driver event determination module 228.

The network packet analysis module 222 is configured to analyze received network packets for processing at the one of more VMs 206. For example, the network packet analysis module 222 may be configured to analyze network packet streams (e.g., headers and payloads of a received network packet) to determine whether they contain one or more malformed network packets, or cannot otherwise access content (e.g., the header, payload, etc.) of the malformed network packets.

The memory access monitoring module 224 is configured to monitor memory access requests by the virtual function drivers 208 of the VMs 206. For example, the memory access monitoring module 224 is configured to determine whether memory access requests are out-of-bounds, or otherwise restricted. Similarly, the hardware access monitoring module 226 is configured to monitor hardware access requests by the virtual function drivers 208 of the VMs 206. For example, the hardware access monitoring module 226 is configured to determine whether hardware access requests are out-of-bounds, or otherwise restricted.

The malicious driver event determination module 228 is configured to determine whether an identified potential malicious driver event (e.g., as may be detected by one of the network packet analysis module 222, the memory access monitoring module 224, the hardware access monitoring module 226, etc.) is an actual malicious driver event. In other words, the malicious driver event determination module 228 is configured to confirm whether the identified potential malicious driver event (e.g., a malformed network packet, an out-of-bounds memory access request, an out-of-bounds hardware request, etc.) should be escalated to a malicious driver event for taking further action, such as by applying a predetermined criteria against the identified potential malicious driver event. For example, in some embodiments, the malicious driver event determination module 228 may determine a detected event is an actual malicious driver event by comparing parameters of the event to digital fingerprints of known malicious events, analyzing parameters of the event, analyzing parameters of the network computing device 106 affected by the event, analyzing historical operational data, and/or by analyzing or comparing any other suitable data capable of determining whether an event is an actual malicious event.

The malicious driver event tracking module 230 is configured to track malicious driver events, such as those escalated to a malicious driver event by the malicious driver event determination module 228. In some embodiments, the malicious driver event tracking module 230 may be configured to track the malicious driver events by type. To do so, the illustrative malicious driver event tracking module 230 includes an event type determination module 232 and an event threshold analysis module 234. The event type determination module 232 is configured to determine a type associated with a malicious driver event. In some embodiments, the type may be based on which module (e.g., from the network packet analysis module 222, the memory access monitoring module 224, the hardware access monitoring module 226, etc.) the malicious driver event is received from. It should be appreciated that, in some embodiments, the type of malicious driver event may be determined in hardware of the network computing device 106.

The event threshold analysis module 234 is configured to update one or more malicious event tracking variables with each instance of a detected malicious driver event. The malicious event tracking variables may include a counter, a list of logged timestamps, a characteristic, and/or any other type of metric usable to compare against a threshold to determine an action subsequent to the detection of the malicious driver event. In some embodiments, the event threshold analysis module 234 may be configured to increment a counter corresponding to a type of the detected malicious driver event. Additionally or alternatively, the event threshold analysis module 234 may be configured to log a timestamp corresponding to a time the malicious driver event was detected. It should be appreciated that, in some embodiments, the detected malicious driver events and/or the malicious event tracking variables may be stored in the detected malicious event data 204.

The event threshold analysis module 234 is further configured to analyze the results of the update to determine whether a threshold was violated. To do so, in some embodiments, the event threshold analysis module may compare the counter value to a maximum occurrence threshold to determine whether the counter value exceeds the maximum occurrence threshold. Additionally or alternatively, the event threshold analysis module 234 may be configured to compare the logged timestamps to a frequency threshold (e.g., a total number of events in a predetermined window of time). In other words, the event threshold analysis module 234 may be configured to determine whether a frequency of detected malicious driver events is less than the frequency threshold. For example, in an embodiment wherein the frequency threshold corresponds to two malicious driver events for the particular type of malicious driver event detected over a 5 second window, in the event that two malicious driver events were detected over a three second span of time, the frequency threshold would be violated. It should be appreciated that, in some embodiments, the frequency threshold and/or the maximum occurrence threshold may be stored in the malicious event threshold data 202.

Additionally, the event threshold analysis module 234 is configured to determine an action based on the analysis. Such action may include resetting the virtual function driver 208 associated with the detected malicious driver event, removing the VM 206 associated with the detected malicious driver event from the network, and/or notifying an administrator of the network.

The virtual machine management module 240 is configured to manage the VMs 206, as well as each of the virtual function drivers 208 associated therewith. To do so, the illustrative virtual machine management module 240 includes a virtual function driver management module 242 to manage each of the virtual function drivers 208 associated with the respective VMs 206. Accordingly, the virtual machine management module 240 is configured to deploy (i.e., spin-up, perform instantiation, etc.) and close (i.e., wind-down, remove from the network, etc.) the VMs 206 based on the various service functions (e.g., based on service functions of a service function chain corresponding to the network packet stream) to be performed on the network traffic.

The administrator notification module 250 is configured to notify an administrator of the network of an occurrence encountered by the network computing device 106. In some embodiments, the administrator notification module 250 may be preconfigured by the administrator with contact information (e.g., a phone number, a fax number, an email address, etc.) such that the administrator notification module 250 can use the contact information to send a notification (e.g., an automated message, a text message, a fax, an email, etc.) to the administrator. Additionally or alternatively, in some embodiments, the administrator notification module 250 may be configured to interface with datacenter management software. In such embodiments, the administrator notification module 250 may be configured to provide an indication to the datacenter management software, which is configured to receive and interpret the indication and perform an escalation of notification based on a severity of the indication. It should be appreciated that, in some embodiments, the notification may be prompted by an action requested by the event threshold analysis module 234 in response to a determination that the event threshold analysis module 234 determined a threshold was violated.

Figure 3:
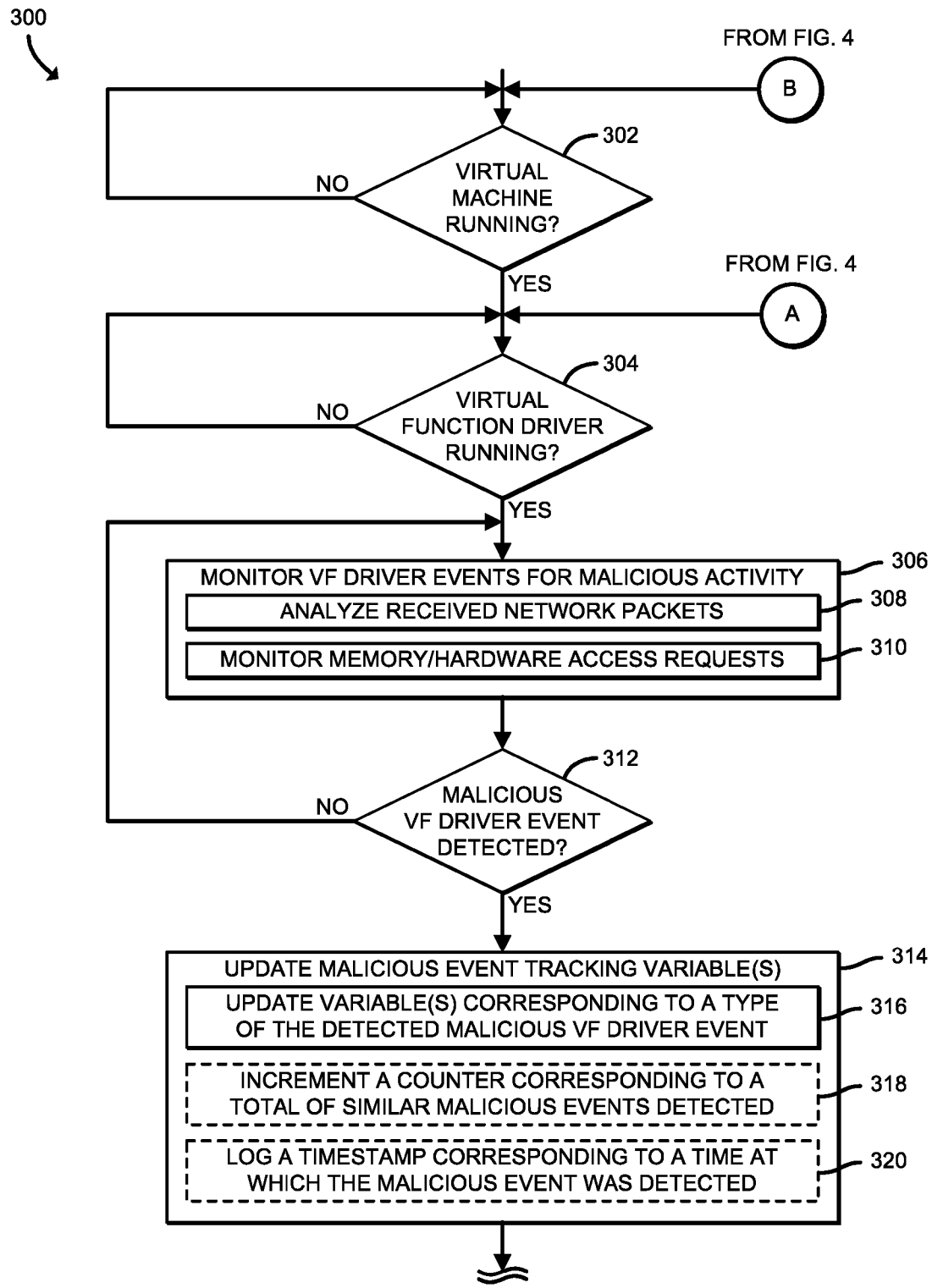
FIGS. 3 and 4 are a simplified flow diagram of at least one embodiment of a method for handling malicious activity of a virtual function driver that may be executed by the network computing device of FIGS. 1 and 2.
Figure 4:
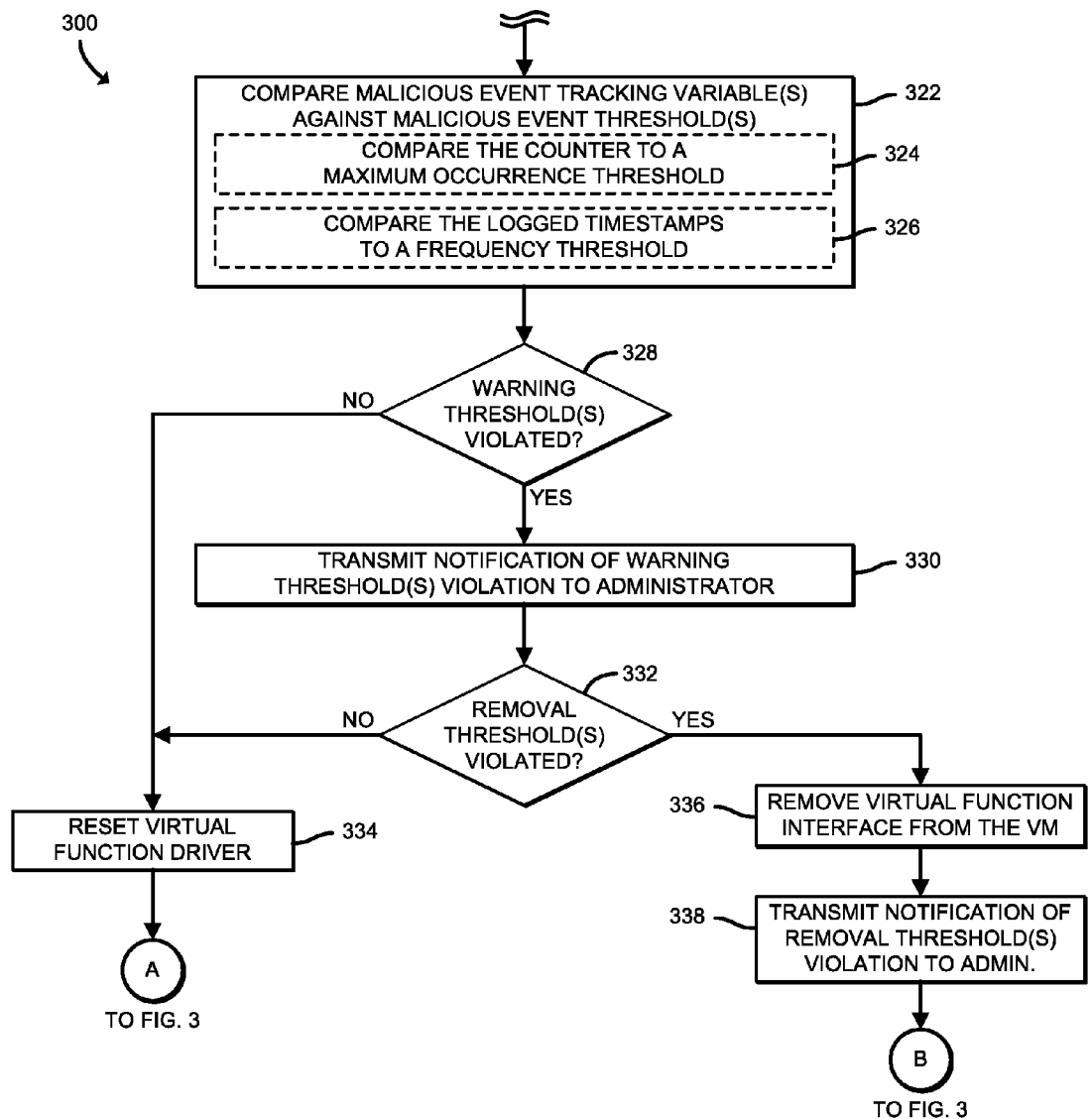

Referring now to FIGS. 3 and 4, in use, the network computing device 106 may execute a method 300 for handling malicious activity of a virtual network driver. It should be appreciated that at least a portion of the method 300 may be offloaded to and executed by the NIC 118 of the network computing device 106. It should be further appreciated that, in some embodiments, the method 300 may be embodied as various instructions stored on a computer-readable media, which may be executed by the processor 108, the NIC 118, and/or other components of the network computing device 106 to cause the network computing device 106 to perform the method 300. The computer-readable media may be embodied as any type of media capable of being read by the network computing device 106 including, but not limited to, the memory 112, the data storage device 114, a local memory of the NIC 118, other memory or data storage devices of the network computing device 106, portable media readable by a peripheral device of the network computing device 106, and/or other media.

The method 300 begins with block 302, in which the network computing device 106 determines whether a virtual machine (e.g., one of the VMs 206 of FIG. 2) is running (i.e., was spun-up) on the network computing device 106. If not, the method loops back to block 302 to monitor whether a virtual machine is running (i.e., presently executing). Otherwise, if a virtual machine is running, the method 300 advances to block 304, in which the network computing device 106 determines whether a virtual function driver (e.g., one of the virtual function drivers 208 of FIG. 1 corresponding to one of the VMs 206) is running. If so, the method 300 advances to block 306.

In block 306, the network computing device 106 monitors events of the virtual function driver to detect malicious activity. To do so, in some embodiments, in block 308, the network computing device 106 analyzes received network packets of a network traffic stream to determine whether one or more of the network packets are malformed. Additionally or alternatively, in some embodiments, in block 310, the network computing device 106 monitors memory and/or hardware access requests to determine whether the access requests are out-of-bounds (i.e., requesting access to restricted memory and/or hardware). It should be appreciated that, in some embodiments, additional and/or alternative virtual function driver events may be monitored to detect malicious activity of the virtual function driver.

In block 312, the network computing device 106 determines whether a malicious virtual function driver event was detected. If not, the method 300 loops back to block 306 to continue monitoring the virtual function driver events for malicious activity; otherwise, the method 300 advances to block 314. In block 314, the network computing device 106 updates one or more malicious event tracking variables (e.g., a counter, a list of timestamps, a metric, etc.) associated with the detected malicious virtual function driver event. To do so, the network computing device 106 updates the malicious event tracking variable(s) based on a type associated with the detected malicious virtual function driver event. For example, in some embodiments, in block 318, the network computing device 106 increments a counter that corresponds to a total of similar malicious events detected (e.g., malicious events of the same type detected at a particular virtual function driver). In another example, in some embodiments, in block 320, the network computing device 106 logs a timestamp corresponding to a time at which the malicious virtual function driver event was detected in block 312.

In block 322, as shown in FIG. 4, the network computing device 106 compares the malicious event tracking variable(s) against one or more corresponding malicious event thresholds. For example, in some embodiments, in block 324, the network computing device 106 compares the counter incremented in block 318 to a maximum occurrence threshold. In another example, in some embodiments, in block 326, the network computing device 106 compares the logged timestamps, the most recent of which having been logged in block 320, to a frequency threshold (i.e., a maximum duration of time elapsed between detecting the malicious virtual function driver events).

It should be appreciated that there may be more than one malicious event threshold level corresponding to a type of malicious virtual function driver event. For example, the different malicious event thresholds may result in different actions being performed, based on the malicious event threshold level. In furtherance of the example, the different malicious event threshold levels may include a warning threshold level and a removal threshold level, with the removal threshold having a threshold value corresponding to a higher escalation than the warning threshold. In other words, exceeding the warning threshold level may result in an action of less significance than the removal threshold level, as shown in blocks 328 through 336.

In block 328, the network computing device 106 determines whether the one or more of the warning thresholds is violated. For example, the network computing device 106 may determine whether the value of the counter incremented in block 318 exceeds a maximum occurrence threshold corresponding to the warning threshold level for that malicious event tracking variable. In another example, the network computing device 106 may determine whether the frequency of occurrence (e.g., as determined by the logged timestamps) is less than the frequency threshold corresponding to the warning threshold level for that malicious event tracking variable. If the network computing device 106 determines that none of the warning thresholds have been violated, the method 300 advances to block 334, wherein the network computing device 106 resets the virtual function driver before the method 300 returns to block 304 to wait until the virtual function driver is running again (i.e., subsequent to the reset).

Otherwise, if the network computing device 106 determines that one or more of the warning threshold level malicious event thresholds has been violated, the method 300 advances to block 330, wherein the network computing device 106 transmits a notification of the warning threshold level malicious event threshold violation to the administrator of the network. As described previously, the network computing device 106 may be configured by the administrator with contact information (e.g., a phone number, a fax number, an email address, etc.) such that the network computing device 106 can use the contact information to send the notification (e.g., an automated message, a text message, a fax, an email, etc.) to the administrator.

In block 332, the network computing device 106 determines whether one or more of the removal threshold level malicious event thresholds has been violated. If not, the method 300 advances to block 334, in which, as described previously, the network computing device 106 resets the virtual function driver before the method 300 returns to block 304 to wait until the virtual function driver is running again (i.e., subsequent to the reset). Otherwise, if the network computing device 106 determines that one or more of the removal threshold level malicious event thresholds has been violated, the method advances to block 336. In block 336, the network computing device 106 removes the virtual function interface corresponding to the virtual function driver for which the violated removal threshold level malicious event threshold was associated. In block 338, similar to block 330, the network computing device 106 transmits a notification of the removal threshold level malicious event threshold violation to the administrator of the network before the method 300 returns to block 302 to monitor whether another virtual machine is running.

It should be appreciated that, in some embodiments, only a single malicious event threshold level may be used. In such embodiments, the single malicious event threshold level may correspond to the removal threshold. In other words, in such embodiments, blocks 328 and 330 of the method 300 may not be present.

EXAMPLES

Illustrative examples of the technologies disclosed herein are provided below. An embodiment of the technologies may include any one or more, and any combination of, the examples described below.

Example 1 includes a network computing device for handling malicious activity of a virtual network driver, the network computing device comprising one or more processors; and one or more data storage devices having stored therein a plurality of instructions that, when executed by the one or more processors, cause the network computing device to monitor events handled by a virtual network driver of a virtual machine of the network computing device to detect malicious activity; update, in response to a determination that malicious activity by the virtual network driver was detected, one or more malicious event tracking variables corresponding to a type of event of the detected malicious activity of the virtual network driver; compare, subsequent to updating the malicious event tracking variables, one or more of the malicious event tracking variables to a corresponding malicious event threshold; and perform an action on the virtual function driver in response to a determination that one or more of the malicious event tracking variables indicates that the corresponding malicious event threshold has been violated.

Example 2 includes the subject matter of Example 1, and wherein to monitor events handled by the virtual network driver to detect malicious activity comprises to analyze network packets received by the network computing device for evidence of malicious content.

Example 3 includes the subject matter of any of Examples 1 and 2, and wherein to monitor events handled by the virtual network driver to detect malicious activity comprises to monitor memory access requests by the virtual network driver.

Example 4 includes the subject matter of any of Examples 1-3, and wherein to monitor events handled by the virtual network driver to detect malicious activity comprises to monitor hardware access requests by the virtual network driver.

Example 5 includes the subject matter of any of Examples 1-4, and wherein the one or more malicious event tracking variables includes a counter and wherein to update the one or more malicious event tracking variables comprises to increment a value of the counter based on the type of event of the detected malicious activity of the virtual network driver.

Example 6 includes the subject matter of any of Examples 1-5, and wherein to compare each of the malicious event tracking variables to the corresponding malicious event threshold comprises to compare the counter value to a counter threshold corresponding to the type of event of the detected malicious activity of the virtual network driver, and wherein to perform the action on the virtual function driver comprises to perform the action in response to a determination the counter value exceeds the counter threshold.

Example 7 includes the subject matter of any of Examples 1-6, and wherein the one or more malicious event tracking variables includes a list of event-detected timestamps, wherein each of the event-detected timestamps of the list corresponds to a time at which a corresponding malicious activity was detected, and wherein to update the one or more malicious event tracking variables comprises to log a timestamp corresponding to a time at which the malicious activity was detected in the list.

Example 8 includes the subject matter of any of Examples 1-7, and wherein the plurality of instructions further cause the network computing device to determine a frequency of malicious events as a function of the list of event-detected timestamps, wherein to compare each of the malicious event tracking variables to the corresponding malicious event threshold comprises to compare the frequency of malicious events to a frequency threshold corresponding to the type of event of the detected malicious activity by the virtual network driver, and wherein to perform the action on the virtual function driver comprises to perform the action in response to a determination the frequency of malicious events is less than the frequency threshold.

Example 9 includes the subject matter of any of Examples 1-8, and wherein to compare each of the malicious event tracking variables to a corresponding malicious event threshold comprises to compare each of the malicious event tracking variables to a corresponding warning threshold and a corresponding removal threshold, wherein the corresponding warning threshold comprises a lower threshold than the corresponding removal threshold.

Example 10 includes the subject matter of any of Examples 1-9, and wherein to perform the action on the virtual function driver comprises to remove a virtual function interface of the virtual function driver in response to a determination that one or more of the malicious event tracking variables violates the corresponding removal threshold.

Example 11 includes the subject matter of any of Examples 1-10, and wherein to perform the action on the virtual function driver further comprises to transmit, in response to a determination that one or more of the malicious event tracking variables violates the corresponding warning threshold, a notification to an administrator of the network computing device.

Example 12 includes the subject matter of any of Examples 1-11, and wherein the plurality of instructions further cause the network computing device to reset the virtual function driver in response to a determination that malicious activity by the virtual network driver was detected.

Example 13 includes a method for handling malicious activity of a virtual network driver, the method comprising monitoring, by a network computing device, events handled by a virtual network driver of a virtual machine of the network computing device to detect malicious activity; updating, by the network computing device and in response to a determination that malicious activity by the virtual network driver was detected, one or more malicious event tracking variables corresponding to a type of event of the detected malicious activity of the virtual network driver; comparing, by the network computing device and subsequent to updating the malicious event tracking variables, one or more of the malicious event tracking variables to a corresponding malicious event threshold; and performing, by the network computing device, an action on the virtual function driver in response to a determination that one or more of the malicious event tracking variables indicates that the corresponding malicious event threshold has been violated.

Example 14 includes the subject matter of Example 13, and wherein monitoring events handled by the virtual network driver to detect malicious activity comprises analyzing network packets received by the network computing device for evidence of malicious content.

Example 15 includes the subject matter of any of Examples 13 and 14, and wherein monitoring events handled by the virtual network driver to detect malicious activity comprises monitoring memory access requests by the virtual network driver.

Example 16 includes the subject matter of any of Examples 13-15, and wherein monitoring events handled by the virtual network driver to detect malicious activity comprises monitoring hardware access requests by the virtual network driver.

Example 17 includes the subject matter of any of Examples 13-16, and wherein the one or more malicious event tracking variables includes a counter and wherein updating the one or more malicious event tracking variables comprises incrementing a value of the counter based on the type of event of the detected malicious activity of the virtual network driver.

Example 18 includes the subject matter of any of Examples 13-17, and wherein comparing each of the malicious event tracking variables to the corresponding malicious event threshold comprises comparing the counter value to a counter threshold corresponding to the type of event of the detected malicious activity of the virtual network driver, and wherein performing the action on the virtual function driver comprises performing the action in response to a determination the counter value exceeds the counter threshold.

Example 19 includes the subject matter of any of Examples 13-18, and wherein the one or more malicious event tracking variables includes a list of event-detected timestamps, wherein each of the event-detected timestamps of the list corresponds to a time at which a corresponding malicious activity was detected, and wherein to update the one or more malicious event tracking variables comprises to log a timestamp corresponding to a time at which the malicious activity was detected in the list.

Example 20 includes the subject matter of any of Examples 13-19, and further including determining a frequency of malicious events as a function of the list of event-detected timestamps, wherein comparing each of the malicious event tracking variables to the corresponding malicious event threshold comprises comparing the frequency of malicious events to a frequency threshold corresponding to the type of event of the detected malicious activity by the virtual network driver, and wherein performing the action on the virtual function driver comprises performing the action in response to a determination the frequency of malicious events is less than the frequency threshold.

Example 21 includes the subject matter of any of Examples 13-20, and wherein comparing each of the malicious event tracking variables to a corresponding malicious event threshold comprises comparing each of the malicious event tracking variables to a corresponding warning threshold and a corresponding removal threshold, wherein the corresponding warning threshold comprises a lower threshold than the corresponding removal threshold.

Example 22 includes the subject matter of any of Examples 13-21, and wherein performing the action on the virtual function driver comprises removing a virtual function interface of the virtual function driver in response to a determination that one or more of the malicious event tracking variables violates the corresponding removal threshold.

Example 23 includes the subject matter of any of Examples 13-22, and wherein performing the action on the virtual function driver further comprises transmitting a notification to an administrator of the network computing device in response to a determination that one or more of the malicious event tracking variables violates the corresponding warning threshold.

Example 24 includes the subject matter of any of Examples 13-23, and further including resetting the virtual function driver in response to a determination that malicious activity by the virtual network driver was detected.

Example 25 includes a network computing device comprising a processor; and a memory having stored therein a plurality of instructions that when executed by the processor cause the network computing device to perform the method of any of Examples 13-24.

Example 26 include one or more machine readable storage media comprising a plurality of instructions stored thereon that in response to being executed result in a network computing device performing the method of any of Examples 13-24.

Example 27 includes a network computing device for handling malicious activity of a virtual network driver, the network computing device comprising a malicious driver event detection module to monitor events handled by a virtual network driver of a virtual machine of the network computing device to detect malicious activity; a malicious driver event tracking module to (i) update, in response to a determination that malicious activity by the virtual network driver was detected, one or more malicious event tracking variables corresponding to a type of event of the detected malicious activity of the virtual network driver and (ii) compare, subsequent to updating the malicious event tracking variables, one or more of the malicious event tracking variables to a corresponding malicious event threshold; and a virtual machine management module to perform an action on the virtual function driver in response to a determination that one or more of the malicious event tracking variables indicates that the corresponding malicious event threshold has been violated.

Example 28 includes the subject matter of Example 27, and wherein to monitor events handled by the virtual network driver to detect malicious activity comprises to analyze network packets received by the network computing device for evidence of malicious content.

Example 29 includes the subject matter of any of Examples 27 and 28, and wherein to monitor events handled by the virtual network driver to detect malicious activity comprises to monitor memory access requests by the virtual network driver.

Example 30 includes the subject matter of any of Examples 27-29, and wherein to monitor events handled by the virtual network driver to detect malicious activity comprises to monitor hardware access requests by the virtual network driver.

Example 31 includes the subject matter of any of Examples 27-30, and wherein the one or more malicious event tracking variables includes a counter and wherein to update the one or more malicious event tracking variables comprises to increment a value of the counter based on the type of event of the detected malicious activity of the virtual network driver.

Example 32 includes the subject matter of any of Examples 27-31, and wherein to compare each of the malicious event tracking variables to the corresponding malicious event threshold comprises to compare the counter value to a counter threshold corresponding to the type of event of the detected malicious activity of the virtual network driver, and wherein to perform the action on the virtual function driver comprises to perform the action in response to a determination the counter value exceeds the counter threshold.

Example 33 includes the subject matter of any of Examples 27-32, and wherein the one or more malicious event tracking variables includes a list of event-detected timestamps, wherein each of the event-detected timestamps of the list corresponds to a time at which a corresponding malicious activity was detected, and wherein to update the one or more malicious event tracking variables comprises to log a timestamp corresponding to a time at which the malicious activity was detected in the list.

Example 34 includes the subject matter of any of Examples 27-33, and wherein the malicious driver event tracking module is further to (i) determine a frequency of malicious events as a function of the list of event-detected timestamps and (ii) compare the frequency of malicious events to a frequency threshold corresponding to the type of event of the detected malicious activity by the virtual network driver, and wherein the virtual machine management module is further to perform the action on the virtual function driver in response to a determination the frequency of malicious events is less than the frequency threshold.

Example 35 includes the subject matter of any of Examples 27-34, and wherein to compare each of the malicious event tracking variables to a corresponding malicious event threshold comprises to compare each of the malicious event tracking variables to a corresponding warning threshold and a corresponding removal threshold, wherein the corresponding warning threshold comprises a lower threshold than the corresponding removal threshold.

Example 36 includes the subject matter of any of Examples 27-35, and wherein to perform the action on the virtual function driver comprises to remove a virtual function interface of the virtual function driver in response to a determination that one or more of the malicious event tracking variables violates the corresponding removal threshold.

Example 37 includes the subject matter of any of Examples 27-36, and wherein to perform the action on the virtual function driver further comprises to transmit, in response to a determination that one or more of the malicious event tracking variables violates the corresponding warning threshold, a notification to an administrator of the network computing device.

Example 38 includes the subject matter of any of Examples 27-37, and wherein the virtual machine management module is further to reset the virtual function driver in response to a determination that malicious activity by the virtual network driver was detected.

Example 39 includes a network computing device for handling malicious activity of a virtual network driver, the network computing device comprising means for monitoring events handled by a virtual network driver of a virtual machine of the network computing device to detect malicious activity; means for updating, in response to a determination that malicious activity by the virtual network driver was detected, one or more malicious event tracking variables corresponding to a type of event of the detected malicious activity of the virtual network driver; means for comparing, subsequent to updating the malicious event tracking variables, one or more of the malicious event tracking variables to a corresponding malicious event threshold; and means for performing an action on the virtual function driver in response to a determination that one or more of the malicious event tracking variables indicates that the corresponding malicious event threshold has been violated.

Example 40 includes the subject matter of Example 39, and wherein the means for monitoring events handled by the virtual network driver to detect malicious activity comprises means for analyzing network packets received by the network computing device for evidence of malicious content.

Example 41 includes the subject matter of any of Examples 39 and 40, and wherein the means for monitoring events handled by the virtual network driver to detect malicious activity comprises monitoring memory access requests by the virtual network driver.

Example 42 includes the subject matter of any of Examples 39-41, and wherein the means for monitoring events handled by the virtual network driver to detect malicious activity comprises means for monitoring hardware access requests by the virtual network driver.

Example 43 includes the subject matter of any of Examples 39-42, and wherein the one or more malicious event tracking variables includes a counter and wherein the means for updating the one or more malicious event tracking variables comprises means for incrementing a value of the counter based on the type of event of the detected malicious activity of the virtual network driver.

Example 44 includes the subject matter of any of Examples 39-43, and wherein the means for comparing each of the malicious event tracking variables to the corresponding malicious event threshold comprises means for comparing the counter value to a counter threshold corresponding to the type of event of the detected malicious activity of the virtual network driver, and wherein the means for performing the action on the virtual function driver comprises means for performing the action in response to a determination the counter value exceeds the counter threshold.

Example 45 includes the subject matter of any of Examples 39-44, and wherein the one or more malicious event tracking variables includes a list of event-detected timestamps, wherein each of the event-detected timestamps of the list corresponds to a time at which a corresponding malicious activity was detected, and wherein to update the one or more malicious event tracking variables comprises to log a timestamp corresponding to a time at which the malicious activity was detected in the list.

Example 46 includes the subject matter of any of Examples 39-45, and further including determining a frequency of malicious events as a function of the list of event-detected timestamps, wherein comparing each of the malicious event tracking variables to the corresponding malicious event threshold comprises means for comparing the frequency of malicious events to a frequency threshold corresponding to the type of event of the detected malicious activity by the virtual network driver, and wherein the means for performing the action on the virtual function driver comprises means for performing the action in response to a determination the frequency of malicious events is less than the frequency threshold.

Example 47 includes the subject matter of any of Examples 39-46, and wherein the means for comparing each of the malicious event tracking variables to a corresponding malicious event threshold comprises means for comparing each of the malicious event tracking variables to a corresponding warning threshold and a corresponding removal threshold, wherein the corresponding warning threshold comprises a lower threshold than the corresponding removal threshold.

Example 48 includes the subject matter of any of Examples 39-47, and wherein the means for performing the action on the virtual function driver comprises means for removing a virtual function interface of the virtual function driver in response to a determination that one or more of the malicious event tracking variables violates the corresponding removal threshold.

Example 49 includes the subject matter of any of Examples 39-48, and wherein the means for performing the action on the virtual function driver further comprises means for transmitting a notification to an administrator of the network computing device in response to a determination that one or more of the malicious event tracking variables violates the corresponding warning threshold.

Example 50 includes the subject matter of any of Examples 39-49, and further including means for resetting the virtual function driver in response to a determination that malicious activity by the virtual network driver was detected.

The invention claimed is:

1. A network computing device for handling malicious activity of a virtual function driver, the network computing device comprising:
one or more processors; and
one or more data storage devices having stored therein a plurality of instructions that, when executed by the one or more processors, cause the network computing device to:
monitor events handled by the virtual function driver of a virtual machine of the network computing device to detect malicious activity;
update, in response to a determination that malicious activity by the virtual function driver was detected, one or more malicious event tracking variables corresponding to a type of event of the detected malicious activity of the virtual function driver;
compare, subsequent to updating the malicious event tracking variables, one or more of the malicious event tracking variables to a corresponding malicious event threshold; and
perform an action on the virtual function driver in response to a determination that one or more of the malicious event tracking variables indicates that the corresponding malicious event threshold has been violated.

2. The network computing device of claim 1, wherein to monitor events handled by the virtual function driver to detect malicious activity comprises to at least one of analyze network packets received by the network computing device for evidence of malicious content, monitor memory access requests by the virtual function driver, and monitor hardware access requests by the virtual function driver.

3. The network computing device of claim 1, wherein the one or more malicious event tracking variables includes a counter,
 wherein to update the one or more malicious event tracking variables comprises to increment a value of the counter based on the type of event of the detected malicious activity of the virtual function driver,
 wherein to compare each of the malicious event tracking variables to the corresponding malicious event threshold comprises to compare the counter value to a counter threshold corresponding to the type of event of the detected malicious activity of the virtual function driver, and
 wherein to perform the action on the virtual function driver comprises to perform the action in response to a determination the counter value exceeds the counter threshold.

4. The network computing device of claim 1, wherein the one or more malicious event tracking variables includes a list of event-detected timestamps, wherein each of the event-detected timestamps of the list corresponds to a time at which a corresponding malicious activity was detected,
 wherein to update the one or more malicious event tracking variables comprises to log a timestamp corresponding to a time at which the malicious activity was detected in the list,
 wherein the plurality of instructions further cause the network computing device to determine a frequency of malicious events as a function of the list of event-detected timestamps,
 wherein to compare each of the malicious event tracking variables to the corresponding malicious event threshold comprises to compare the frequency of malicious events to a frequency threshold corresponding to the type of event of the detected malicious activity by the virtual function driver, and
 wherein to perform the action on the virtual function driver comprises to perform the action in response to a determination the frequency of malicious events is less than the frequency threshold.

5. The network computing device of claim 1, wherein to compare each of the malicious event tracking variables to a corresponding malicious event threshold comprises to compare each of the malicious event tracking variables to a corresponding warning threshold and a corresponding removal threshold, wherein the corresponding warning threshold comprises a lower threshold than the corresponding removal threshold.

6. The network computing device of claim 5, wherein to perform the action on the virtual function driver comprises to remove a virtual function interface of the virtual function driver in response to a determination that one or more of the malicious event tracking variables violates the corresponding removal threshold.

7. The network computing device of claim 5, wherein to perform the action on the virtual function driver further comprises to transmit, in response to a determination that one or more of the malicious event tracking variables violates the corresponding warning threshold, a notification to an administrator of the network computing device.

8. The network computing device of claim 1, wherein the plurality of instructions further cause the network computing device to reset the virtual function driver in response to a determination that malicious activity by the virtual function driver was detected.

9. One or more non-transitory, computer-readable storage media comprising a plurality of instructions stored thereon that in response to being executed cause a network computing device to:
 monitor events handled by a virtual function driver of a virtual machine of the network computing device to detect malicious activity;
 update, in response to a determination that malicious activity by the virtual function driver was detected, one or more malicious event tracking variables corresponding to a type of event of the detected malicious activity of the virtual function driver;
 compare, subsequent to updating the malicious event tracking variables, one or more of the malicious event tracking variables to a corresponding malicious event threshold; and
 perform an action on the virtual function driver in response to a determination that one or more of the malicious event tracking variables indicates that the corresponding malicious event threshold has been violated.

10. The one or more non-transitory, computer-readable storage media of claim 9, wherein to monitor events handled by the virtual function driver to detect malicious activity comprises to at least one of analyze network packets received by the network computing device for evidence of malicious content, monitor memory access requests by the virtual function driver, and monitor hardware access requests by the virtual function driver.

11. The one or more non-transitory, computer-readable storage media of claim 9, wherein the one or more malicious event tracking variables includes a counter,
 wherein to update the one or more malicious event tracking variables comprises to increment a value of the counter based on the type of event of the detected malicious activity of the virtual function driver,
 wherein to compare each of the malicious event tracking variables to the corresponding malicious event threshold comprises to compare the counter value to a counter threshold corresponding to the type of event of the detected malicious activity of the virtual function driver, and
 wherein to perform the action on the virtual function driver comprises to perform the action in response to a determination the counter value exceeds the counter threshold.

12. The one or more non-transitory, computer-readable storage media of claim 9, wherein the one or more malicious event tracking variables includes a list of event-detected timestamps,
 wherein each of the event-detected timestamps of the list corresponds to a time at which a corresponding malicious activity was detected,
 wherein to update the one or more malicious event tracking variables comprises to log a timestamp corresponding to a time at which the malicious activity was detected in the list, wherein the plurality of instructions further cause the network computing device to determine a frequency of malicious events as a function of the list of event-detected timestamps,
  wherein to compare each of the malicious event tracking variables to the corresponding malicious event threshold comprises to compare the frequency of malicious events to a frequency threshold corresponding to the type of event of the detected malicious activity by the virtual function driver, and
  wherein to perform the action on the virtual function driver comprises to perform the action in response to a determination the frequency of malicious events is less than the frequency threshold.

13. The one or more non-transitory, computer-readable storage media of claim 9, wherein to compare each of the malicious event tracking variables to a corresponding malicious event threshold comprises to compare each of the malicious event tracking variables to a corresponding warning threshold and a corresponding removal threshold, wherein the corresponding warning threshold comprises a lower threshold than the corresponding removal threshold.

14. The one or more non-transitory, computer-readable storage media of claim 13, wherein to perform the action on the virtual function driver comprises to remove a virtual function interface of the virtual function driver in response to a determination that one or more of the malicious event tracking variables violates the corresponding removal threshold.

15. The one or more non-transitory, computer-readable storage media of claim 13, wherein to perform the action on the virtual function driver further comprises to transmit, in response to a determination that one or more of the malicious event tracking variables violates the corresponding warning threshold, a notification to an administrator of the network computing device.

16. The one or more non-transitory, computer-readable storage media of claim 10, wherein the plurality of instructions further cause the network computing device to reset the virtual function driver in response to a determination that malicious activity by the virtual function driver was detected.

17. A method for handling malicious activity of a virtual function driver, the method comprising:
  monitoring, by a network computing device, events handled by the virtual function driver of a virtual machine of the network computing device to detect malicious activity;
  updating, by the network computing device and in response to a determination that malicious activity by the virtual function driver was detected, one or more malicious event tracking variables corresponding to a type of event of the detected malicious activity of the virtual function driver;
  comparing, by the network computing device and subsequent to updating the malicious event tracking variables, one or more of the malicious event tracking variables to a corresponding malicious event threshold; and
  performing, by the network computing device, an action on the virtual function driver in response to a determination that one or more of the malicious event tracking variables indicates that the corresponding malicious event threshold has been violated.

18. The method of claim 17, wherein monitoring events handled by the virtual function driver to detect malicious activity comprises at least one of analyzing network packets received by the network computing device for evidence of malicious content, monitoring memory access requests by the virtual function driver, and monitoring hardware access requests by the virtual function driver.

19. The method of claim 17, wherein the one or more malicious event tracking variables includes a counter,
  wherein updating the one or more malicious event tracking variables comprises incrementing a value of the counter based on the type of event of the detected malicious activity of the virtual function driver,
  wherein comparing each of the malicious event tracking variables to the corresponding malicious event threshold comprises comparing the counter value to a counter threshold corresponding to the type of event of the detected malicious activity of the virtual function driver, and
  wherein performing the action on the virtual function driver comprises performing the action in response to a determination the counter value exceeds the counter threshold.

20. The method of claim 17, wherein the one or more malicious event tracking variables includes a list of event-detected timestamps,
  wherein each of the event-detected timestamps of the list corresponds to a time at which a corresponding malicious activity was detected,
  wherein updating the one or more malicious event tracking variables comprises (i) logging a timestamp in the list of event-detected timestamps corresponding to a time at which the malicious activity was detected and (ii) determining a frequency of malicious events as a function of the list of event-detected timestamps,
  wherein comparing each of the malicious event tracking variables to the corresponding malicious event threshold comprises comparing the frequency of malicious events to a frequency threshold corresponding to the type of event of the detected malicious activity by the virtual function driver, and
  wherein performing the action on the virtual function driver comprises performing the action in response to a determination the frequency of malicious events is less than the frequency threshold.

21. The method of claim 17, wherein comparing each of the malicious event tracking variables to a corresponding malicious event threshold comprises comparing each of the malicious event tracking variables to a corresponding warning threshold and a corresponding removal threshold, wherein the corresponding warning threshold comprises a lower threshold than the corresponding removal threshold.

22. The method of claim 21, wherein performing the action on the virtual function driver comprises (i) removing a virtual function interface of the virtual function driver in response to a determination that one or more of the malicious event tracking variables violates the corresponding removal threshold and (ii) transmitting a notification to an administrator of the network computing device in response to a determination that one or more of the malicious event tracking variables violates the corresponding warning threshold.

23. A network computing device for handling malicious activity of a virtual function driver, the network computing device comprising:
  malicious driver event detection circuitry to monitor events handled by the virtual function driver of a virtual machine of the network computing device to detect malicious activity;

means for updating, in response to a determination that malicious activity by the virtual function driver was detected, one or more malicious event tracking variables corresponding to a type of event of the detected malicious activity of the virtual function driver;

means for comparing, subsequent to updating the malicious event tracking variables, one or more of the malicious event tracking variables to a corresponding malicious event threshold; and virtual machine management circuitry to perform an action on the virtual function driver in response to a determination that one or more of the malicious event tracking variables indicates that the corresponding malicious event threshold has been violated.

24. The network computing device of claim 23, wherein the one or more malicious event tracking variables includes a counter, wherein the means for updating the one or more malicious event tracking variables comprises means for incrementing a value of the counter based on the type of event of the detected malicious activity of the virtual function driver, wherein the means for comparing each of the malicious event tracking variables to the corresponding malicious event threshold comprises means for comparing the counter value to a counter threshold corresponding to the type of event of the detected malicious activity of the virtual function driver, and wherein to perform the action on the virtual function driver comprises to perform the action in response to a determination the counter value exceeds the counter threshold.

25. The network computing device of claim 23, wherein the one or more malicious event tracking variables includes a list of event-detected timestamps, wherein each of the event-detected timestamps of the list corresponds to a time at which a corresponding malicious activity was detected, wherein the means for updating the one or more malicious event tracking variables comprises means for (i) logging a timestamp in the list of event-detected timestamps corresponding to a time at which the malicious activity was detected and (ii) determining a frequency of malicious events as a function of the list of event-detected timestamps, wherein the means for comparing each of the malicious event tracking variables to the corresponding malicious event threshold comprises means for comparing the frequency of malicious events to a frequency threshold corresponding to the type of event of the detected malicious activity by the virtual function driver, and wherein to perform the action on the virtual function driver comprises to perform the action in response to a determination the frequency of malicious events is less than the frequency threshold.

\* \* \* \* \*